Patented May 17, 1932

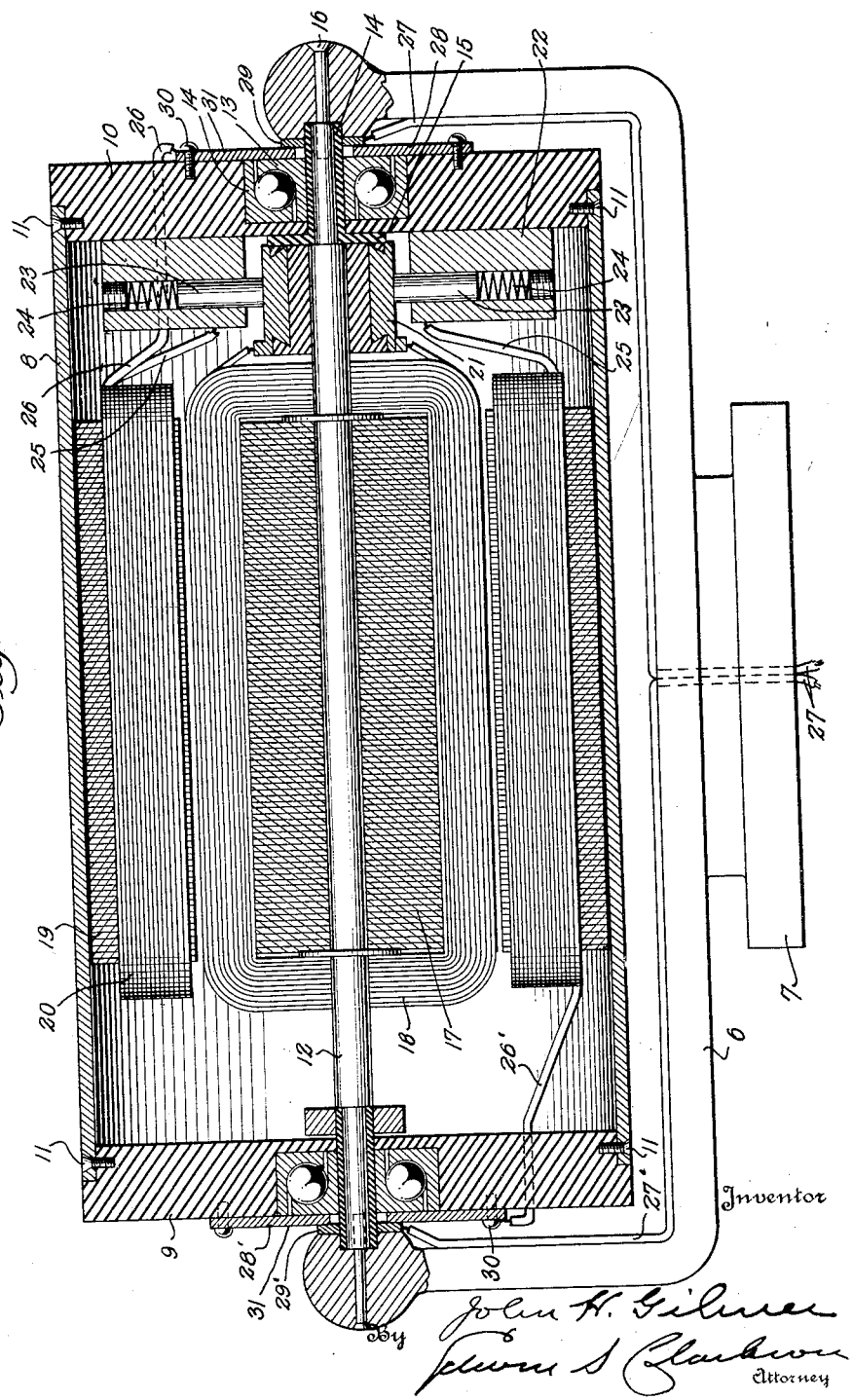

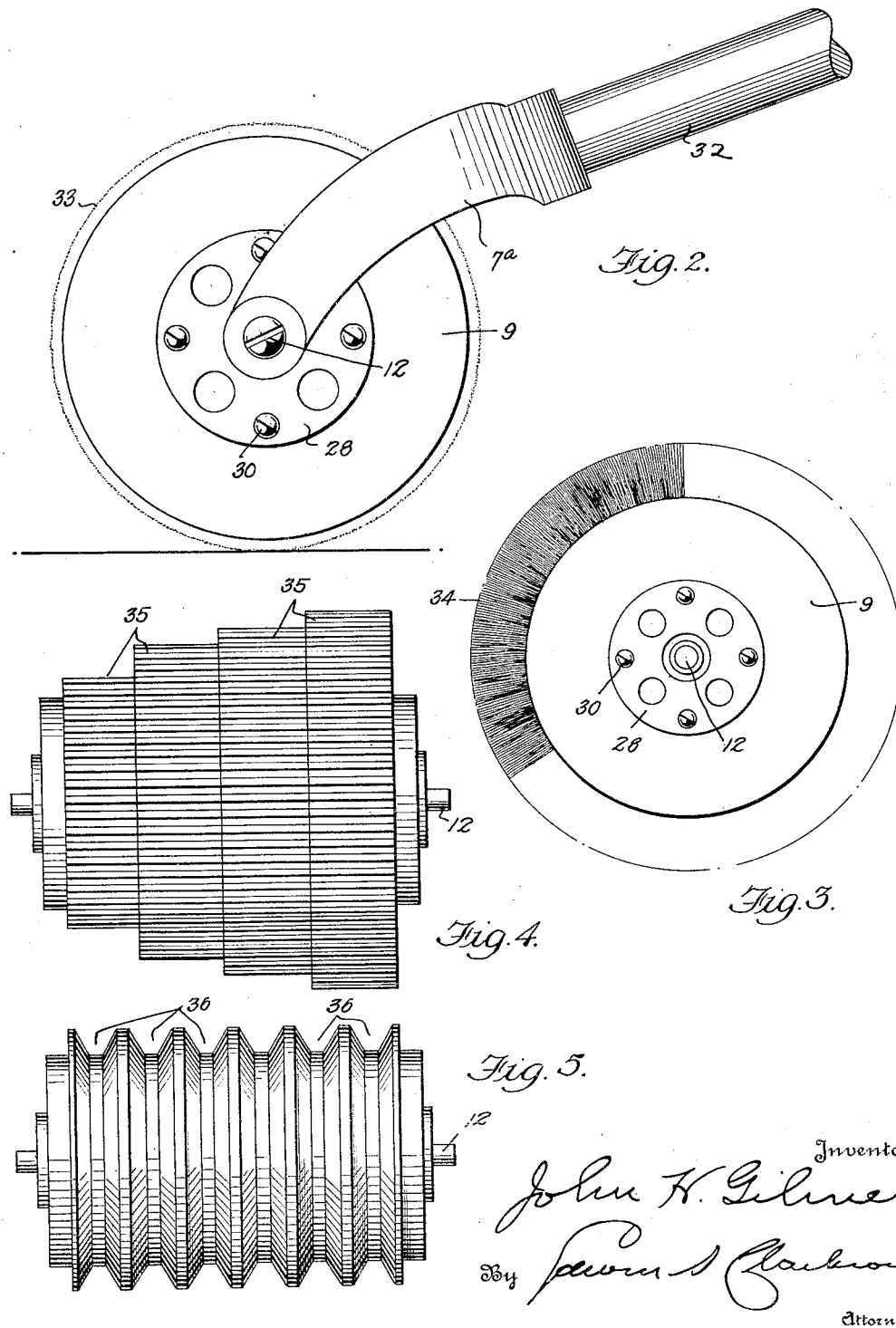

1,858,666

UNITED STATES PATENT OFFICE

JOHN H. GILMER, OF NORTH VERNON, INDIANA

SELF-CONTAINED IMPULSE ACTUATED INTERNALLY PROPELLED POWER UNIT

Application filed November 14, 1929. Serial No. 407,238.

The object of my invention is to convert available power into useful work by the use of a compact mechanism in the general form of a pulley, wheel, gear or drum. As the action is similar in all cases the description will be confined to that of a pulley. The pulley has a peripheral surface which may be flat, crowned or grooved, or of any shape desired. It is concentrically mounted on a power unit, air, water, steam, or electrically driven utilizing the broad principle of a stator concentrically mounted axially within a rotor, but I will for the present confine the description to the use of electrically driven unit.

This pulley may be electrically driven by any one of a number of different arrangements of the usual armature and field found in electrical motors of ordinary use. Taken into consideration the development of electrical motors of today and the standardization of equipment I will describe my apparatus using the following movement actuating method.

Taking the armature of a motor of the desired capacity together with its shaft, winding and commutators, etc., I will mount this concentrically within a field of the standard construction, which field will be contained within a cylindrical wall of the peripheral member of the pulley. The armature will be held in locked position so that it may not revolve. Contrary to the usual practice the field carrying the peripheral member will revolve on suitable bearings around the armature member; this method will not entail any changes in the usual wiring system, nor method of bringing the current into the armature and field; it will permit of larger and more suitable bearings; it will give equal power, give cheaper construction and economize on space which is often an essential item in the design of both standard and special machines; it permits of the combination of motor and pulley into a very compact space. This pulley may then be used for power transmission through a flat belt or a belt of any other cross-section, or a number of such belts, or it may be covered with polishing material, or compound and used as a polishing drum. The field portion of this unit may have cut in its housing, teeth to form a gear for gear driven equipment confining the motor and gear to the space usually occupied by the gear only.

In the drawings:

Figure 1 is a vertical longitudinal sectional view showing an embodiment of my improved power unit.

Figure 2 is a more or less diagrammatic view of a form of my power unit embodied in a polishing machine.

Figure 3 is an end elevation of a form of my power unit with a brush secured to the periphery of the revolving field.

Figure 4 is a front elevation of a form of my power unit having gears on its periphery.

Figure 5 is a front elevation of a form of my power unit having belt grooves on its periphery.

It will, of course, be understood that the use of my invention is not limited to the embodiments shown, as there are many other uses to which the principle of a stator mounted within a rotor which is integral with work performing or power transmitting surface may be applied.

The reference numeral 6 designates a frame of any desired construction or shape, which may be secured to any desired base, or support 7. The motor shell 8 is provided with heads 9 and 10 of insulating material secured thereto by any suitable means, such, for instance, as the screws 11. The heads carrying the motor shell are revolubly mounted on the shaft 12, the ends of which are rigidly secured to the arms of the frame 6, as clearly shown in Figure 1. Ball bearings 13 seated in recesses in the heads 9 and 10 are interposed between the stationary shaft 12 and the heads 9 and 10, and an insulating sleeve 14 is interposed between each bearing and the shaft 12, as shown in Figure 1, said sleeve, or bushing, having an annular flange 15 at its inner end. A set screw 16 extends from each frame arm into the adjacent end of the shaft 12.

An armature core lamination 17 is carried by the shaft 12, and an armature winding 18 is also carried by the shaft and disposed around the lamination 17.

Field laminations 19, are carried by the revolving motor shell 8, which are surrounded by the field winding 20.

A commutator 21 is mounted on the shaft 12. Brush holders 22 are carried by the heads 9 and 10 of the revolving motor shell 8, in which holders the commutator brushes 23 are mounted, there being springs 24 to hold the brushes in contact with the commutator. The reference numeral 25 designates the conductor wires between the brush holders and the field winding; the conductor wires 26 and 26' between the field and the line wires 27 and 27' being connected with the line wires through the conductor plates 28 and 28' and bushings 29 and 29'.

As will be seen, the field revolves instead of the armature, the armature being held stationary, therefore power transmission is taken from the outside of the revolving field, which, as shown, functions as a pulley, gear, polisher, etc., in power transmission. The plates 28 and 28' serve not only as conductors but also as detachable cover plates for the recesses in the heads in which the ball bearings are confined.

In Figure 2 I have shown my motor secured to the frame 7a having a handle 32, said motor having a polishing element 33 on its periphery to polish and finish surfaces, such as floors, etc.

In Figure 3 I show the motor having a brush 34 on its periphery.

In Figure 4 I show the motor having gears 35 on its periphery.

In Figure 5 I show the periphery of the motors provided with a multiplicity of belt grooves 36 to function in a multiple belt drive.

As will be seen, my improved motor can be used in connection with many types of machines, and does not require much space which is a very material consideration in many types of machines.

The brush holders 22 and end plate 10 may be formed integral, if desired.

What I claim is:

In an electrically driven tool or power unit, a frame, a stationary shaft carried thereby, a rotary casing provided with a work performing surface and including end heads of insulating material, said heads having recesses in their outer faces, ball bearings between the heads and shaft and disposed in said recesses, detachable conductor plates closing said recesses, line conductors connected with the conductor plates, armature and field windings respectively carried by the shaft and casing, conducting connectors on the shaft and casing and between the windings, and current conductors between one of the conductor plates and the field winding and between the other conductor plate and the armature winding.

In testimony whereof I affix my signature.

JOHN H. GILMER.